United States Patent [19]

Chaum

[11] Patent Number: 4,987,593
[45] Date of Patent: Jan. 22, 1991

[54] ONE-SHOW BLIND SIGNATURE SYSTEMS

[76] Inventor: David Chaum, 14652 Sutton St., Sherman Oaks, Calif. 91403

[21] Appl. No.: 504,878

[22] Filed: Apr. 5, 1990

Related U.S. Application Data

[63] Continuation of Ser. No. 384,092, Jul. 24, 1989, Pat. No. 4,914,698, which is a continuation of Ser. No. 168,802, Mar. 16, 1988, abandoned.

[51] Int. Cl.$^5$ ............................................... H04L 9/00
[52] U.S. Cl. ........................................ 380/3; 380/25; 380/30
[58] Field of Search .............................. 380/25, 30, 3

[56] References Cited

U.S. PATENT DOCUMENTS 4,914,698  4/1990  Chaum ................................. 380/30

FOREIGN PATENT DOCUMENTS 0318097  5/1989  European Pat. Off. .............. 380/30

*Primary Examiner*—Salvatore Cangialosi
*Attorney, Agent, or Firm*—Nixon & Vanderhye

[57] ABSTRACT

Numbers standing for cash money can be spent only one time each, otherwise the account from which they were withdrawn would be revealed. More generally, a technique for issuing and showing blind digital signatures ensures that if they are shown responsive to different challenges, then certain information their signer ensures they contain will be revealed and can be recovered efficiently. Some embodiments allow the signatures to be unconditionally untraceable if shown no more than once. Extensions allow values to be encoded in the signatures when they are shown, and for change on unshown value to be obtained in a form that is aggregated and untraceable.

13 Claims, 5 Drawing Sheets

ONE-SHOW BLIND SIGNATURE SYSTEMS

This is a continuation of application Ser. No. 07/384,092, filed July 24, 1989, now U.S. Pat. No. 4,914,698 which is a continuation of Ser. No. 07/168,802, filed Mar. 16, 1988, now abandoned.

BACKGROUND OF THE INVENTION

1. Field of the Invention

This invention relates to cryptographic systems, and more specifically to public-key digital signature systems providing unlinkability.

2. Description of Prior Art

Blind signatures are known in the art, as described in European Patent Publication No. 0139313, dated 2/5/85, claiming priority on U.S. Ser. No. 524896, titled "Blind signature systems," and European Patent Publication No. 0218305, dated 4/15/87, claiming priority on U.S. Ser. No. 784999, titled "Unanticipated blind signature systems," both by the present applicant.

These signatures can be used rather directly to construct a payment system (as described, for instance, in the applicant's "Security without identification: Transaction systems to make Big-Brother obsolete," Communications of the ACM, Oct. 1985, pp. 1030–1044.) In such systems, a bank might charge, say, one dollar to make a blind signature. People can buy such signatures from the bank (the blinding lets them keep the bank from learning which ones they bought) and then spend them at, say, a shop. The shop could check with the bank in an on-line transaction to verify upon receiving a particular signature that it has not already been spent elsewhere. If shops do not perform such checking, then someone could spend the same number in more than one shop, and the blind signatures would protect them from ever being traced. But on-line checking may be costly or even infeasible in many applications.

Another use of blind signatures is in credential mechanisms. These were also introduced in the article cited above, and have since been further detailed in "A secure and privacy-protecting protocol for transmitting personal information between organizations," that appeared in Proceedings of Crypto 86, A. M. Odlyzko Ed., Springer-Verlag, 1987, by the present applicant and J. -H. Evertse. When "digital pseudonyms" are established for showing or receiving credentials in such mechanisms, it may be necessary to perform an on-line transaction to ensure that the same pseudonym has not already been used before.

In all these systems, there are essentially three parties: (1) the signature issuing party; (2) the plurality of parties to whom signatures are issued by the first party; and (3) the pluarlity of parties to whom the signatures are shown by the second parties. One aspect that could be improved-without reducing unlinkability for "honest" second parties-is that the third parties must check with one another or some clearing center before accepting a signature, otherwise they will have no recourse if it turns out that the same signature has already been shown to more than a single third party.

OBJECTS OF THE INVENTION

Accordingly, it is an object of the present invention to provide a public-key digital signature system that allows signatures to be issued by a first party to a second party and for the second party to provide them to a third party, where cooperation of the first and third parties is unable trace second parties that do not show any signature more than once.

Another object of the present invention is to allow such untraceability to be unconditional, in the sense that (still assuming the second party does not show any signature more than once) even if unlimited computing resources were to become available to the first and third parties, tracing would remain impossible.

A further object of the present invention is to allow the first and third parties to efficiently detect and trace (back to the particular issue of the signature by the first party) a second party who shows any single signature more than once.

An additional object of the present invention is to allow said detecting and tracing to be done at any time after a signature is shown more than once.

A still further object of the present invention is to allow the second party to encode a number into the form of the signature that is shown.

Yet another object of the present invention is to allow said number to represent a value, and for the second party to be able to later obtain a refund for the difference between the value shown and the maximum value.

An even further object of the present invention is to allow the refund of value to be obtained for at least parts of more than one signature shown, in such a way that the particular value originally shown is not revealed during refund.

Still another object of the present invention is to allow efficient, economical, and practical apparatus and methods fulfilling the other objects of the invention.

Other objects, features, and advantages of the present invention will be appreciated when the present description and appended claims are read in conjunction with the drawing figures.

BRIEF DESCRIPTION OF THE DRAWING FIGURES

BRIEF SUMMARY OF THE INVENTION

Figure 1:
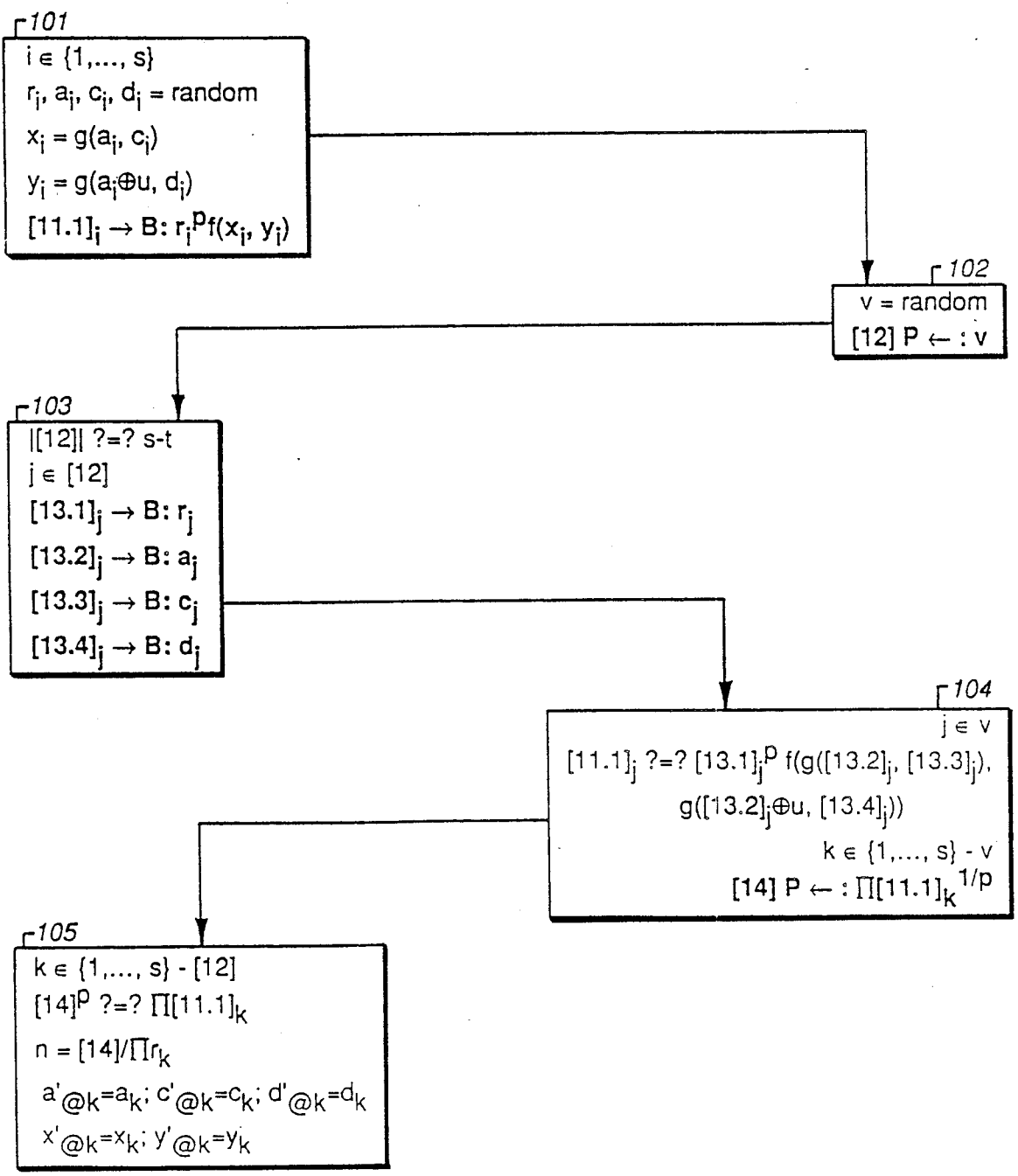
FIG. 1 shows a flowchart of a preferred embodiment of a first exemplary one-show blind signature obtaining protocol in accordance with the teachings of the present invention.

In accordance with these and other objects of the present invention, a brief summary of an exemplary embodiment will now be presented. Some simplifications and omissions may be made in this brief summary, which is intended only to highlight and introduce some aspects of the invention, but not to limit its scope. Detailed descriptions of preferred exemplary embodiments adequate to allow those of ordinary skill in the art to make and use the inventive concepts are provided later.

The basic protocol is in three parts: party P obtaining a one-show signature from party B; P showing a one-show signature to party S; and B detecting and tracing signatures that have been shown more than once. (These letters have been chosen as mnemonic devices for clarity only to stand for payer, bank, and shop, without any limitation on applications being implied.)

There is a certain structure that B ensures is built into signatures when they are issued. When they are shown, certain parts of this structure are exposed, with the choice of what parts being at least somewhat out of the control of P. If even one more part of the signature were exposed, then a simple computation would allow an identifier that was built-into the structure of the signature to be determined. If the signature were to be shown a second time, different parts of the structure can be expected to be revealed, and hence it will become traceable via the identifier.

More specifically, a particular case of the preferred embodiment (denoted as $t=1$ in the later descriptions) involves a signature on a value of the form $f(g(a,c), g(a\oplus u,d))$, where f and g are one-way functions. When this signature is shown, the pre-images under one of the g's must be shown to S but only the image of the other g need be shown. This data can be tested by S, simply by applying the public functions and checking that what results is the message of the digital signature it receives.

Suppose now that the pre-images under the other g are also learned in a second showing of the signature. First notice that the two showings are easily associated with each other since they would involve exactly the same image under f. The identifying information u would then easily be derived simply by forming $u=a^{-1}\oplus(a\oplus u)$, where $\oplus$ is a group operation.

The choice of which g will have its arguments revealed can be encoded as a single bit. More generally, there are t terms in the signature, each of the same form as the one shown. A t-bit string is a challenge that determines which half will be opened for each term. If these challenges differ, even in one bit position, then enough will be revealed to allow u to be easily determined.

For untraceability, it is of course necessary that a g cannot be inverted to recover its pre-images. If the c and d arguments are randomly chosen from a set at least as large as the range of g, then it may not be possible to invert g uniquely.

A variation encodes an amount of, say, money in some part of the challenge string. Other signatures are also issued by B that can be shown only if the corresponding bit of the challenge string is shown as 0. These allow P to get change for the unspent value. But since they can be separate signatures, change from more than one original signature can be obtained at once, thereby hiding the exact amounts used in each payment.

GENERAL DESCRIPTION

Figure 2:
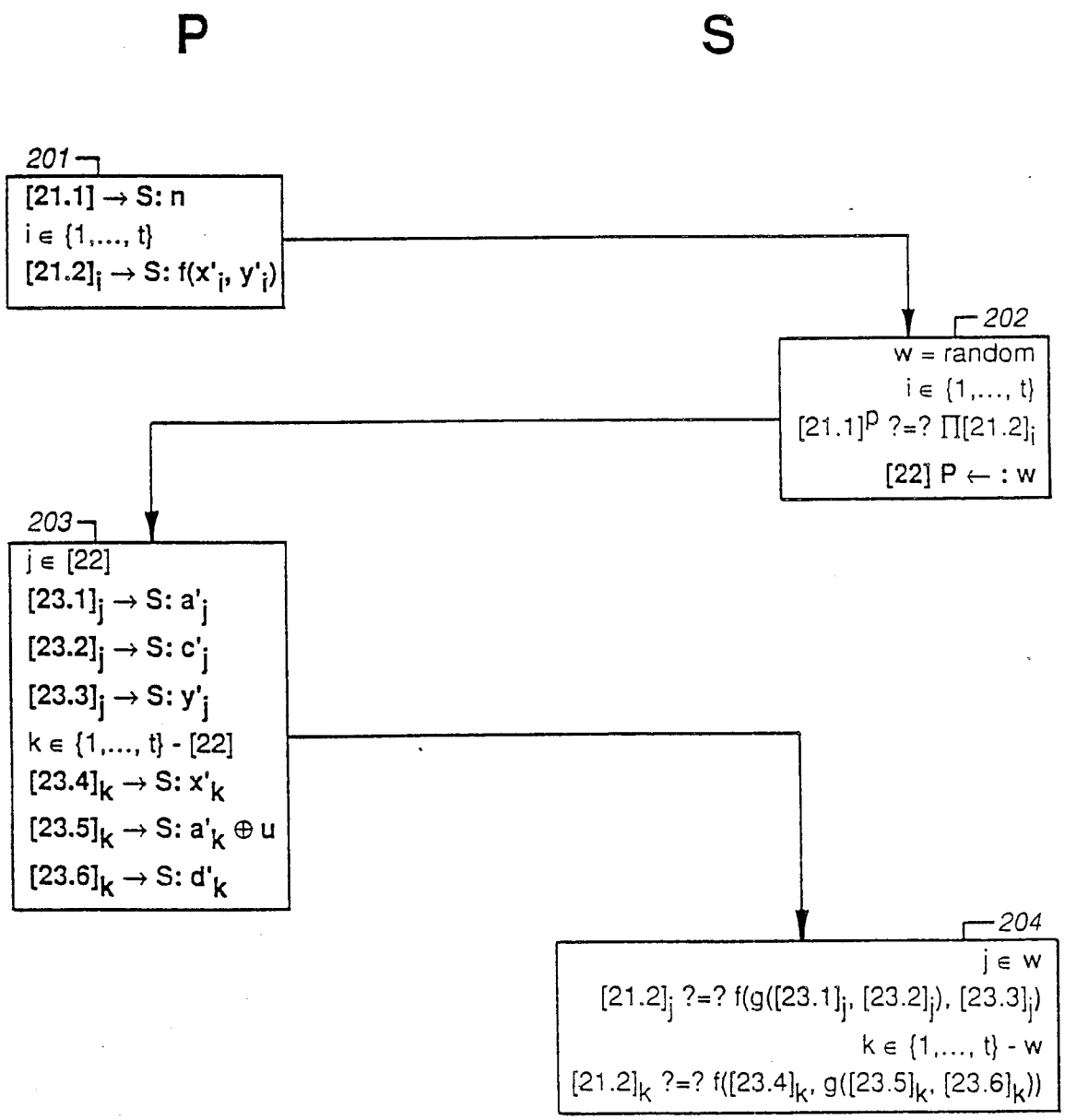
FIG. 2 shows a flowchart of a preferred embodiment of a first exemplary one-show blind signature showing protocol in accordance with the teachings of the present invention.
Figure 3:
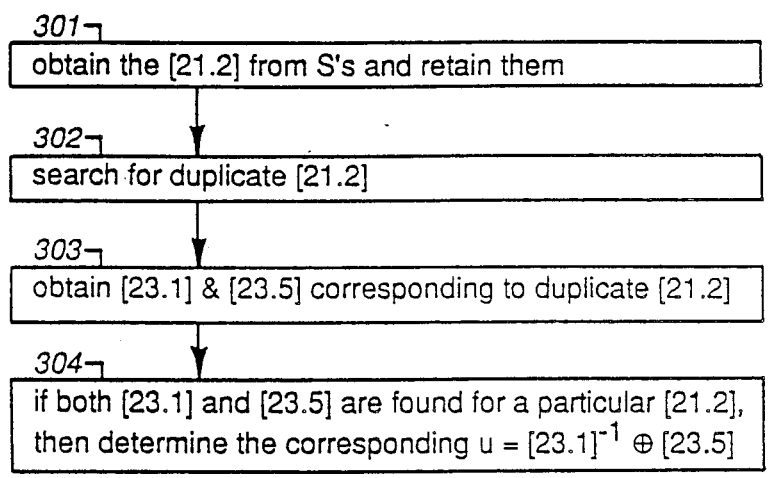
FIG. 3 shows a flowchart of a preferred embodiment of a first exemplary multiple-showing detection and tracing protocol in accordance with the teachings of the present invention.
Figure 5:
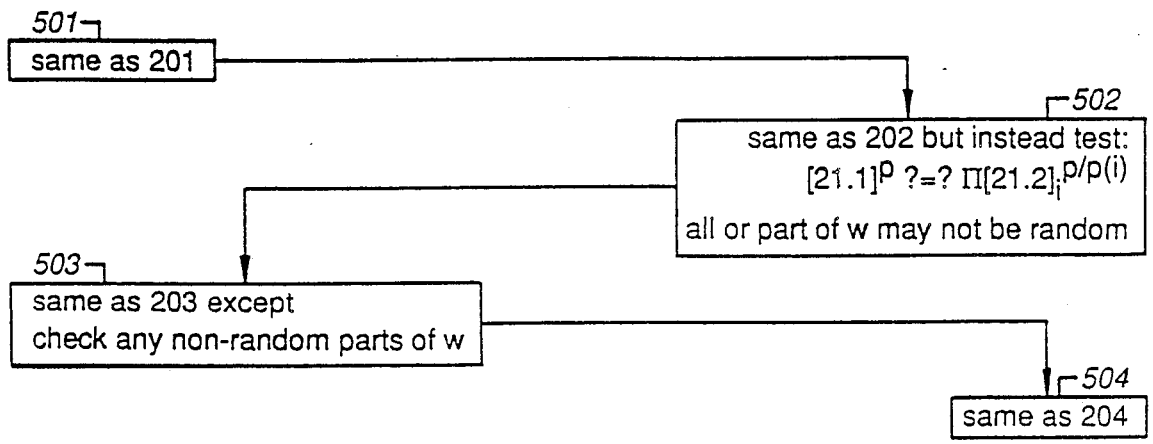
FIG. 5 shows a flowchart of a preferred embodiment of a second exemplary one-show blind signature showing system extension to FIG. 2 in accordance with the teachings of the present invention.
Figure 6:
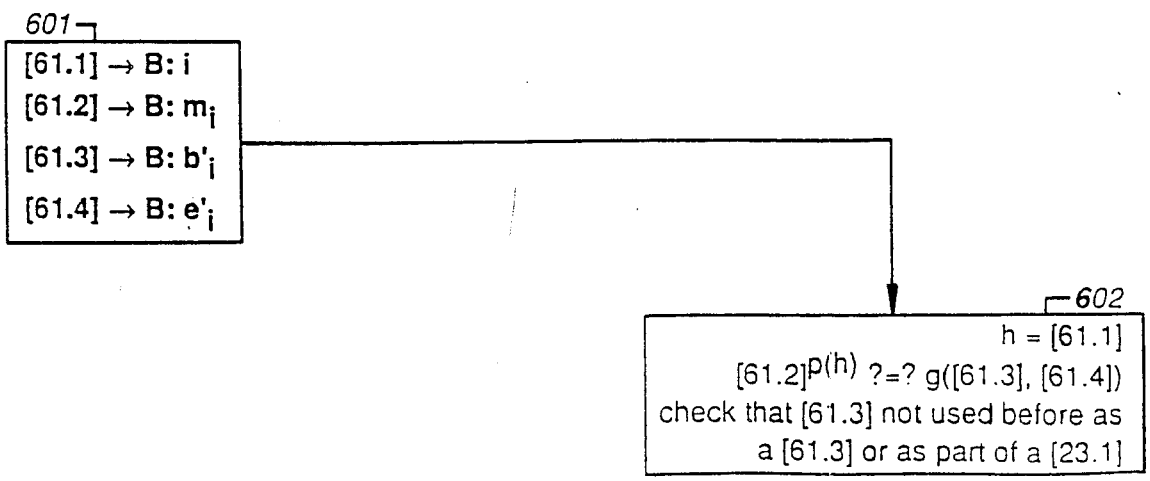
FIG. 6 shows a flowchart of a preferred embodiment of a refund signature showing system, for the exemplary embodiments of FIG. 4 and FIG. 5, in accordance with the teachings of the present invention.

The cryptographic method and means described here may be divided into a basic first embodiment and a second extended embodiment. In the first embodiment, a first transaction (FIG. 1) allows party P to obtain a signature from a party B. The second transaction (FIG. 2) allows this signature to be accepted from P by S responsive to a number w that may be unknown to P a priori. The third transaction allows B to uncover u (an identifier) that B associates with P if and only if P shows the signature with sufficiently different w (FIG. 3). The second embodiment can use this third transaction unmodified, but has a modified issuing transaction between P and B (FIG. 4), a modified showing transaction between P and S (FIG. 5), and an unshown reclaim transaction between P and B (FIG. 6).

DETAILED DESCRIPTION OF PREFERRED EMBODIMENTS

While it is believed that the notation of FIGS. 1-6 would be clear to those of ordinary skill in the art, it is first reviewed here for definiteness.

The operations performed are grouped together into flowchart boxes. The column that a box is in indicates which party performs the operation defined in that box. The columns are labeled by party name across the top. The operation of saving a value under a symbolic name is denoted by the symbolic name on the left of an equal sign and an expression for the value on the right-hand side. Another kind of operation is an equality test. The "?=?" symbol is used to indicate these tests, and the testing party terminates the protocol if the test does not hold. (If the test is the last operation to be performed by a party during a protocol, then the success or failure of the test determines the party's success or failure with the protocol.) The final kind of operation is that of sending a message. This is shown by a message number on the left; followed by the name of the recipient party and an arrow (these appear for readability as either a recipient name then left pointing arrow, when the recipient is on the left; or right pointing arrow then recipient name, when the recipient is on the right); followed by a colon; finally followed by an expression denoting the actual value of the message that should be sent.

Several kinds of expressions are used. One is just the word "random". This indicates that a value is preferably chosen uniformly from an appropriate set, defined in the text, and independently of everything else in the protocol. Thus a party should preferably employ a physical random number generator for these purposes, possibly with appropriate post-processing. In practice, however, well known cryptographic and pseudo-random techniques may be applied possibly in combination with physical sources.

Another kind of expression involves exponentiation. All such exponentiation is preferably over the residues modulo a composite M, whose factorization is preferably available only to party B, such moduli being well known in the art, as first proposed in "A method for obtaining digital signatures and public-key cryptosystems," by Rivest, Shamir and Adleman, Communications of the ACM, Feb. 1978, pp. 120-126. When no operation is shown explicitly, multiplication modulo M is assumed.

Figure 4:
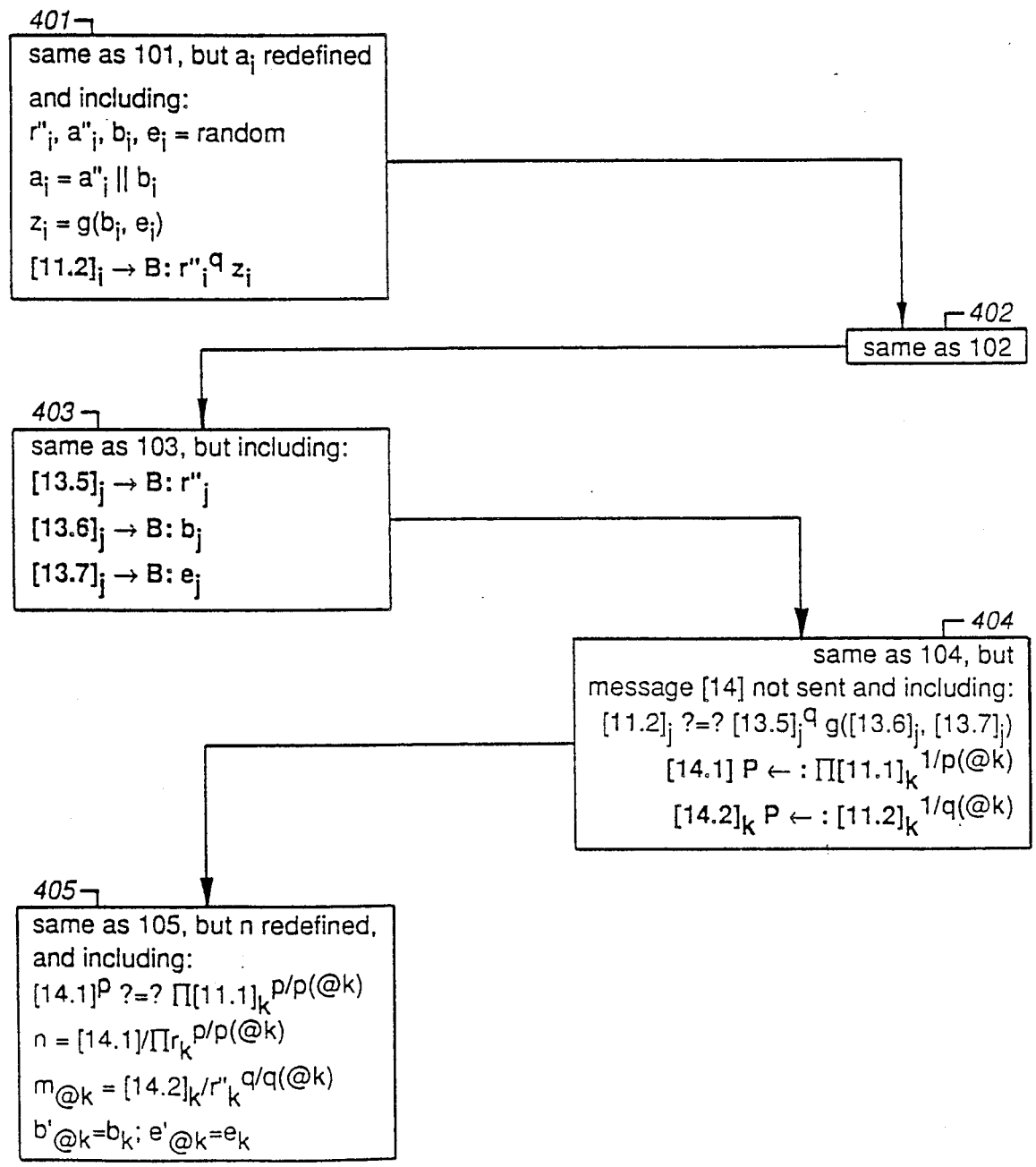
FIG. 4 shows a flowchart of a preferred embodiment of a second exemplary one-show blind signature obtaining system extension to FIG. 1 in accordance with the teachings of the present invention.

Different public exponents may be used with the modulus M. In FIG. 1, 2, and 3, only public exponent p is used. This might be any suitable number: 2, a modest size odd prime, a prime large enough to ensure that it is coprime with the order of the reduced residue system, or any other integer. In the extension of FIG. 4, 5, and 6, $p=GCD(p(1), p(2), \ldots, p(t))$ and $q=GCD(q(1), q(2), \ldots, q(t))$. The p(i) and q(i) might each contain a distinct prime factor, as well as other common factors; or they might contain increasing multiplicities of some factor or factors. For example, $p(i)=2^i$ and $q(i)=2^i$, is believed to be secure and to offer economy in computation, particularly when the convention is taken that smaller exponents stand for lower denominations.

Even public exponents do require extra attention, as would be obvious to those of skill in the art, since for one thing square roots do not exist for many residues. Thus, B's choice of things to sign (determined by the set called v, as will be described) would necessarily avoid the unsigneable. Another way to address this issue is by application of the well known special composite form with exactly two factors, each congruent to 3 modulo 4: the blinding factors would randomly include a standard public non-square with Jacobi symbol 1 along with an image under f adjusted to have Jacobi symbol 1; each term of a signature under a distinct even exponent would have at B's option the public non-square included under the signature; and signatures would be accepted of images under f with an optional multiple of the public non-square. Notice further that if both parties put the public non-square in, then it can be taken out of the signature by P when its square root is also public. Care must also of course be taken that s is large enough that the chance of a square root on a chosen message being learned by a cheater is acceptably small.

When "/" is used in the base, the multiplicative inverse is first calculated for the expression on the right and then this is multiplied by the expression on the left; when used in the exponent by B, it denotes the same operation just describe, but the arithmetic is modulo the order of the group of residues modulo M; when used in the exponent by a party other than B, it denotes integer division. The results of all operations are assumed for convenience and clarity to be encoded as binary integers (the least positive representative is assumed for residue classes). Concatenation, denoted by " $||$ ", is thus defined as juxtaposition of the bit vectors representing values.

The functions f and g are preferably publicly-agreed one-way functions, (being thought of as) having two arguments, such functions well know in the art. Each image under g may be assumed to be conformable as an argument for f, and each image under f in turn is representable as a residue modulo M, all in some standard way. These functions should preferably be "collision free," in the sense that it is difficult to find more than one valid argument pair that yields the same result, a property commonly achieved in the cryptographic art.

A further desirable property of g is that for each particular allowed first argument, there exist the same number of second arguments that produce each possible output; in other words, fixing any first argument gives a k-to-one map from the second argument to the output. This novel and inventive property is believed to offer the advantage of "unconditional" protection against tracing; that is, even infinite computing power is thought to be unable to determine the first argument of a g given only its result. In any case, functions believed to have such properties, or to be close to them in some absolute or merely computational sense, may offer similar advantages. Since a "random" one-way function from the concatenation of the (suitably-sized) arguments may be expected to come rather close to the desired properties, it is believed that almost any one-way function could be used.

One exemplary way to construct a preferred such function is to apply a bijective one-way function, such as are well known in the public key cryptographic art as "discrete-log" problems over some group, to the second argument and to use the group operation involved to combine the result with the image under a one-way function of the first argument. For instance, the first argument might be used as the exponent of a primitive element modulo a first large prime and the result (possibly after applying, say DES with a fixed key or the like) added, modulo a second large prime, to the result of raising a primitive element modulo the second prime to the second argument power. Bijective post-scrambling of the final result might be provided by a final application of, say, DES with a fixed key; and similar pre-scrambling of each of the original two arguments may also be used.

The infix operator "$\oplus$" is the group operation of addition modulo a prime as large as any u, to be described. It would be obvious to those of skill in the art how bit-wise exclusive-or, or any suitable group operation could also be used.

Subscripts, on both symbolic names and message numbers, denote indexes that for clarity are taken to be over the natural numbers; set notation (including set difference) is used to indicate the ordered sets over which these range. Symbolic names i, j, and k are used for indices. Cardinality of sets is shown as usual by surrounding them with "|" symbols. A special operation shown as "@" is used for clarity as a prefix on the symbolic name of an index; this denotes the position of the index within its ordered index set. (For example, if $i \epsilon \{3, 1, 4\}$ and $g_1, g_2, g_3, g_4 = 4,8,1,7$ then $g_i = 1,4,7$ and $g_i + g@_i = 5,12,8$). The usual $\pi$ notation is used for products modulo M, where the index in the expression following the $\pi$ is taken to run over its full index set.

Two parameters, s and t, are assumed known and agreed to all parties using them; they determine the size of the index sets used and increasing them increases security. Quite high security is believed to result form taking $t = 100$ and $s = 200$, but far smaller values may be used in practice. This is especially true when multiple instances of FIG. 1 are conducted together, as mentioned later. The value of u is known to at least P and B, and might be a unique identifier for the particular transaction or for such combined transactions as mentioned.

Turning now to FIG. 1, the first part of a flowchart for the preferred embodiment will now be described in detail.

Box 101 shows P choosing $r_i$, $a_i$, $c_i$ and $d_i$ at random, such random selection as already mentioned, where i runs over the first s natural numbers. The $r_i$ are used to form "blinding factors" by being raised to public exponents, and hence they are preferably chosen from $\{1, \ldots, M-1\}$, as is known in the art. The $a_i$ are preferably uniform to reduce the chance that two different payers choose the same one. The $c_i$ and $d_i$ will be used as the second argument to g, and are thus preferably chosen to maximize the desired properties already described for g, such as being chosen uniformly from the domain of the second argument of g. Then P computes the $x_i$ by applying g to the corresponding $a_i$ as first argument and $c_i$ as second argument. Next the $y_i$ are computed in a similar way, but each $a_i$ is combined by the group operation $\oplus$ with u to form the first argument to g and the $d_i$ are taken as the second argument, with the result denoted symbolically as the corresponding $y_i$. Next s messages are formed and sent to B as indicated by the notation already described. The ith message $[11.1]_i$ is a product modulo M of $r_i$ raised to the p times f applied to first argument $x_i$ and second argument $y_i$.

Box 102 indicates that, after receiving messages $[11.1]$, B first chooses v at random uniformly from the subsets of $\{1, \ldots, s\}$ with cardinality s-t and then returns this subset to P as message [12].

Box 103 describes first how P checks that the cardinality of this subset received as message [12] is s-t. As called for by the notation already defined, if this test is not satisfied, then P stops, otherwise P continues by first assigning the index j to range over this set. Then messages $[13.1]_j$, $[13.2]_j$, $[13.3]_j$, and $[13.4]_j$ are formed from $r_j$, $a_j$, $c_j$ and $d_j$, respectively, and sent to B.

Box 104 defines the actions of C after receipt of messages $[13.1]_j$, $[13.2]_j$, $[13.3]_j$, and $[13.4]_j$. For all indices j in the set v, message $[11.1]_j$ is compared for equality with the product modulo M of the message $[13.1]_j$ raised to the p times an image under f of its two arguments, each of which is an image under g. The first application of g has message $[13.2]_j$ as its first argument and $[13.3]_j$ as its second; the second of these has a first argument consisting of message $[13.2]_j$ combined using the operation $\oplus$ with u, and second argument $[13.4]_j$. If this test is passed for all j, B continues. Next k is allowed to run over all elements in $\{1, \ldots, s\}$ not in v. The product of all the $[11.1]_k$ is formed and raised modulo M to the 1/p power, denoting the pth root as already described. This value is then provided to P as message [14].

Box 105 denotes P first setting k to run over all elements in $\{1, \ldots, s\}$ not in [12]. Then message [14] received is raised to the p power modulo M and compared for equality with the product modulo M of all the [11.1] indexed by k. If this test is passed, P goes on to set n to the product modulo M of message [14] times the multiplicative inverse of the product of all the $r_k$. Finally, the $a_k$, $c_k$, $d_k$, $x_k$, and $y_k$ are assigned new indices: the first element in the ordered index set that j ranges over selects the $a_i$ that receives new index 1, the second element in the index set of j determines which element obtains index 2, and so on for all elements in the index set; the same applies for the $c_k$, $d_k$, $x_k$, and $y_k$.

Turning now to FIG. 2, the second flowchart for part of the preferred embodiment will now be described in detail.

Box 201 begins by P sending message [21.1] to S containing the value of n that was computed in box 105 as already described. The index set for i is taken to be the first t natural numbers. Then, for each value of i, message $[21.2]_i$ is sent after being formed as the image under f with first argument $x'_i$ and second argument $y'_i$.

Box 202 shows that S first chooses index set w at random from all subsets of $\{1, \ldots, t\}$. Then S tests the p power of message [21.1] for equality with the product of all the $[21.2]_i$, all modulo M. If the test is satisfied, S continues by sending message [22], providing w to P.

Box 203 is the meeting of the challenge defined by message [22] received by P. For those elements j in [22], $a'_j$, $c'_j$, and $y'_j$ are sent to S as message $[23.1]_j$, $[23.2]_j$, and $[23.3]_j$, respectively; for those elements k in $\{1, \ldots, t\}$ but not in [22], $x'_k$, $a'_k \oplus u$, and $d'_k$, are sent as messages $[23.4]_k$, $[23.5]_k$, and $[23.6]_k$, respectively.

Boxes 204 represents the reception and checking by S of the [23.1] through [23.6]. For each j in w, message $[21.2]_j$ is tested for equality with the image under f of two arguments: first is the image under g of $[23.1]_j$ and $[23.2]_j$, in that order; and second is $[23.3]_j$. For each k not in w but in $\{1, \ldots, t\}$, message $[21.2]_k$ is tested for equality with the image under f of two arguments: first is $[23.4]_k$; and second is the image under g of $[23.5]_k$ and $[23.6]_k$, in that order.

Turning now to FIG. 3, the third flowchart for part of the preferred embodiment will now be described in detail.

Box 301 indicates how B first obtains and records the [21.2] from each S.

Box 302 then indicates that B searches for duplicities among the [21.2] received in box 301. One exemplary embodiment would store the [21.2] in some suitable way as they are received in [301] and this would easily be adapted to detect the duplications. (As would be obvious to those of skill in the art, it is anticipated that so called "hashing" might be an appropriate data structure for this, and since these are already images under a one-way function, some of their bits might be used directly as hash values.) Another example would be for many [21.2] to be stored as a batch unsorted and then to periodically sort those received and possibly merge them in with others already received. Various ways to detect such duplicities based on sorting or searching techniques are widely known in the computer science art.

Box 303 shows that B then obtains [23.1] and [23.5] messages, whichever are available, corresponding to at least two instances of a particular value of [21.2] detected as repeated in 302. It is expected that these would be obtained from each S that supplied the duplicate [21.2]. They might, for example, be provided by the S's together with the [21.2]; if batch sorting is performed in 302, then B could archive the [23.1] and [23.5] and retrieve those corresponding to duplicates as needed. Or in case, for example, the [23.1] and [23.5] are not supplied along with the [21.2], then B might request these from the S's, perhaps individually if which S supplied which [23.2] were known to B.

Box 304 shows how B can reconstruct the u corresponding to a particular [21.2] for which both the [23.1] and [23.5] are known. This is accomplished simply by combining the inverse in the group of [23.1] with the [23.5] using the group operation $\oplus$.

Turning now to FIG. 4, the fourth flowchart for part of the preferred embodiment will now be described in detail.

The boxes in this flowchart represent the modifications to the corresponding boxes in FIG. 1 to produce the second exemplary embodiment; for clarity and readability, only the changes have been shown. More specifically, boxes 401, 402, 403, 404, and 405 indicate the changes to boxes 101, 102, 103, 104, and 105, respectively.

Box 401 shows the changes to the actions defined in box 101 for P. The definition of the symbolic name a used in box 101 is replaced by that provided in box 401; otherwise the operations and messages shown in box 401 define only additional actions that should be included in box 101 for the second embodiment. Values for the ith component ($1 \leq i \leq s$) of four symbolic names are chosen at random: $r''_i$ is chosen from the set of residues modulo M; $a''_i$ is a string of length capable of just holding a group element under $\oplus$; $b_i$ is chosen as a bit string whose length, after being appended to $a''_i$, is the appropriate size for the first input to g; and $e_i$ is chosen much as $c_i$ and $d_i$ in FIG. 1. (It will be appreciated that u might be chosen by B, and need not contain as much information as required for the $a_i$, since it need not be protected against "birthday paradox" induced problems; hence, group elements under $\oplus$ can be expected to conveniently leave enough room in the first argument of g to contain a suitably large b.) For each index i, still running from 1 to s, the value of $a_i$ is computed as the concatenation of $a''_i$ and $b_i$, with the $b_i$ part occupying higher-order bit positions (that do not survive the modular addition defined by $\oplus$). The encoding of the result of this as a bit string is the first input to g used in forming $x_i$ in FIG. 1; the encoding and group operation shown in forming $y_i$ in FIG. 1 leave no information about b in the first argument to that g. Additionally, $z_i$ is taken as the image under g formed from $b_i$ as first argument and $e_i$ as second argument. Message $[11.2]_i$ is sent to B containing the corresponding $z_i$ blinded by being multiplied modulo M with $r'_i$ raised to the q power.

Box 402 is the same as 102, with the reception of message $[11.2]_i$ implicit.

Box 403 indicates three additional messages that are included among those described in box 103. For each j as defined in 103, messages $[13.5]_j$, $[13.6]_j$, and $[13.7]_j$, sent by B contain the values $r''_j$, $b_j$, and $e_j$, respectively.

Box 404 depicts the modifications to box 104, which are all inclusions, except that former message [14] is not sent. Each message $[11.2]_j$ is tested for equality with the product of the corresponding message $[13.5]_j$ received raised to the q and an image under g. The first argument to g is the message $[13.6]_j$ received and the second is $[13.7]_j$ received. If the equality holds, messages [14.1] and $[14.2]_k$ are formed and sent to P. Each term in the product modulo M making [14.1] is the pth root modulo M of one of the $[11.1]_k$; the [11.1] whose index is the first element in the ordered set v-{1, ..., s} obtains the the p(1)th root, the message whose index is the second element in that set obtains the p(2)th root, and so on through the last element in the set. For each value of k, running through the same index set, message $[14.2]_k$ is formed as the q(@k)th root modulo M of message $[11.2]_k$; thus, the message with q(i)th root, for instance, has index i and is formed from a message whose index is the ith element in the ordered index set v-{1, ..., s}.

Box 405 depicts the changes to box 105 for P: the definition of symbolic name n used in box 105 is replaced by that provided in box 405; otherwise the operations and messages shown in box 405 define only additional actions. First message [14.1] raised to the p is checked for equality with a product of powers of the $[11.1]_k$ modulo M. The term corresponding to each index value taken on by k in its set defined in box 105 is $[11.1]_k$ raised to a power that is the integer quotient of p divided by p(i), where i is the position of that k (denoted @k) in the index set. Then n is formed as the product of message [14.1] times the multiplicative inverse of a product of $r_k$. Each term in this product corresponds to one of the elements in the index set of k, where the base is $r_k$ and its exponent is the integer quotient p divided by p(@k). Then $m_k$ is formed as the product of message $[14.2]_k$ times the multiplicative inverse of an $r_k$. Each of these corresponds to one of the elements in the index set of k, where the base is $r''_k$ and its exponent is the integer quotient of q divided by q(@k). Finally, the elements of $b_k$ and $e_k$ are re-indexed and re-labeled for later use as b' and e', respectively. The indexing of the retained elements is their positional number in the index set over which k ranges.

Turning now to FIG. 5, the fifth flowchart for part of the preferred embodiment will now be described in detail.

Box 501 shows that box 201 needs no modification for this second embodiment.

Box 502 expresses the changes in box 202, which include replacing the equality test and a possible change in w to include some or all non-random parts, which may be that agreed elements of w each correspond to a denomination, and that if such an element appears in w, then that means that an amount corresponding to that denomination is transferred. The new test is for equality between [21.1] raised to the p and a product modulo M of t terms ($1 \leq i \leq t$), each of the form $[21.2]_i$ raised to the integer p divided by the integer p(i) power.

Box 503 indicates how box 203 need not be changed except to check any possibly non-random parts of w that can be expected, as already mentioned.

Box 504 merely confirms that box 204 need not be modified for this second exemplary embodiment.

Turning now to FIG. 6, the sixth flowchart for part of the preferred embodiment will now be described in detail.

This Fig. represents a transaction between P and B that has not been described for the first embodiment, as already mentioned.

Box 601 shows P sending four messages to B: [61.1], [61.2], [61.3], and [61.4]; comprising i, $m_i$, $b'_i$, and $e'_i$, respectively.

Box 602 illustrates how B first receives these four messages, and saves [61.1] under the symbolic name h. Next B tests an equality: the left-hand-side is message [61.2] raised to the p(h) and on the right is g applied to first argument message [61.3] and second argument message [61.4]. Finally, B searches through all previously accepted [61.3] to ensure that this new [61.3] is not among them, before it must be considered so included; similarly B also checks that the suffix of the received message [61.3] (beyond the prefix whose length is that of the a'') is not equal to the suffix of any message [23.1] received in the modification of FIG. 2 described in FIG. 5.

Certain variations and substitutions may be apparent to those of ordinary skill in the art.

For example, in the protocol of FIG. 2, a possibly compressing one-way function of the $x_i$ and $y_i$ would be sufficient to commit P to their order in place of messages $[21.2]_j$. (Even such a compressed image is unnecessary, if the convention is made that the order of the images under f should be lexicographic on their binary representations, as will also be mentioned later with regard to FIG. 4 and FIG. 5). Or, as another illustration, the quantity of data that need be saved between FIG. 1 and FIG. 2 by P can be reduced below what is shown by, for instance, not retaining the x' and y' and simply reconstructing them, as was done for the f's in box 201.

Instead of the particular blinding indicated, which is essentially that of the first mentioned blind signature publication, the techniques disclosed in the second mentioned blind signature publication could be used. Furthermore, the signature scheme denoted with public exponent q could be over a different modulus or could even be a totally different kind of signature, such as those described in the co-pending application titled "Unanticipated signature systems," with U.S. Ser. No. 123,703, filed Nov. 23, 1987, by the present applicant. Such signatures could also be on products of terms, as with those under p, where multiple instances of the protocol of FIG. 4 would be conducted by a particular P before the [14.2] are returned. These instances might be conducted in a way that B receives all the message [11]'s before supplying a plurality of challenge sets v, with the only constraint that these are disjoint and of cardinality t. Moreover, this approach could also be taken in applying the techniques of FIG. 1. Also, the signatures of the first embodiment could use different public exponents for different terms, as is done for the second embodiment; or the second embodiment may need only a single public exponent when the already mentioned lexicographic ordering technique is used. (In case of FIG. 4, the ordering would have to be sent as say [11.3], and it would be checked by B as part of those tests made in box 404 for the jth entries.)

A further variation would be to include more g's in an f. The u could be divided among these g's by techniques variously called "key-sharing," "shadow," or "partial key," as are well known in the art. One less than the so called "threshold" of these schemes would be the number of g's whose arguments should be revealed during showing.

While these descriptions of the present invention have been given as examples, it will be appreciated by those of ordinary skill in the art that various modifications, alternate configurations and equivalents may be employed without departing from the spirit and scope of the present invention.

What is claimed is:

1. In a public-key digital signature system, the improvement comprising the steps of:
    issuing digital signatures by an issuing party and the issuing party ensuring that with substantial probability each of the issued signatures contains identifying information;
    showing at least one of said issued signatures to at least one checking party to allow the checking party to verify the digital signature property of the signatures shown while substantially concealing, from even cooperation of every checking party and said signature issuing party, the identifying information contained in signatures shown at most once; and
    testing said shown signatures to yield with substantial probability said identifying information contained in signatures shown more than once.

2. The method of claim 1, wherein said identifying information is divided between at least two parts included in each of said signatures issued; at least one of said parts is revealed during said showing and checking of said signatures; and said testing yields the identifying information contained in the parts of said signatures that are revealed by the signatures being shown more than once.

3. The method of claim 1, wherein the step of showing said signatures includes the transmission of a challenge by said checking party to the party showing the signature and subsequent transmission of a corresponding response value by the showing party to the checking party, where the distinct responses to multiple distinct challenges result in response values that reveal said identifying information but where a single response value does not reveal the identifying information.

4. The method of claim 1, further comprising the steps of: choosing first values of arguments by a party to whom a first signature is issued, the signature containing first identifying information, and the party using the first argument values to influence the signature issued; and cooperation of said issuing and showing steps to allow substantially any single showing corresponding to said first issuing and first values of said arguments to also correspond to a distinct second issuing having distinct second identifying information for some second values of said arguments.

5. The method of claim 1, wherein each of said plural signatures is issued in one of plural issuing transactions and said identifying information included in each signature determines a proper subset of issuing transactions that with substantial probability includes the transaction in which that signature was issued.

6. The method as in claims 1, 2, 3, 4 or 5, wherein said issued signatures are shown in exchange for value.

7. The method of claim 6, further comprising the steps of:
    providing amount indications, by a party to whom a signature is issued, to determine an amount of payment;
    providing refund indications, by said party to whom a signature is issued, to determine an amount of refund; and
    processing to recognize any of said refund indications for which said amount of payment plus said amount of refund exceeds a pre-arranged maximum.

8. The method of claim 7, wherein said amount of refund is substantially aggregated over a plurality of said amounts of payment thereby concealing the linking between said payment indications and said refund indications that would be provided if each of the amounts of refund were to correspond to particular amounts of payment.

9. In a public-key digital signature system, the improvement comprising:
    a. digital signatures having identifying information;
    b. means for checking said signatures when shown and means for substantially concealing said identifying information in said signatures shown once; and
    c. signature testing means for yielding with substantial probability said identifying information in said signatures shown more than once.

10. The signature system of claim 9, wherein said identifying information is divided into at least two parts, at least one of said parts is revealed when said signature is shown and said testing means yields said identifying information from the parts revealed when said signature is shown more than once.

11. The signature system of claim 9 further comprising:
    d. means for transmitting a challenge of said signature being shown, and
    e. means for transmitting a response to said challenge which reveals said identifying information only when more than one of said challenges is transmitted.

12. The signature system of claim 9, wherein each of said signatures is issued in one of a plurality of issuing transactions, and said identifying information included in each signature determines a proper subset of issuing transactions that with substantial probability includes the transaction in which that signature was issued.

13. In the signature system as in any one of claims 9 to 12, said signature is a form of payment for value.

* * * * *